(12) United States Patent
Olsson

(10) Patent No.: US 8,661,931 B2
(45) Date of Patent: Mar. 4, 2014

(54) STEERING COLUMN ASSEMBLY

(75) Inventor: Tobias Olsson, Ljungsarp (SE)

(73) Assignee: Kongsberg Power Products Systems AB, Ljungsarp (SE)

( * ) Notice: Subject to any disclaimer, the term of this patent is extended or adjusted under 35 U.S.C. 154(b) by 116 days.

(21) Appl. No.: 13/247,355

(22) Filed: Sep. 28, 2011

(65) Prior Publication Data

US 2012/0073399 A1    Mar. 29, 2012

(30) Foreign Application Priority Data

Sep. 28, 2010  (EP) .................................... 10181058

(51) Int. Cl.
*B62D 1/18* (2006.01)
*B62D 1/20* (2006.01)

(52) U.S. Cl.
USPC ................................ 74/497; 74/493; 280/775

(58) Field of Classification Search
USPC ............. 74/492–497, 499; 280/775, 776, 779
See application file for complete search history.

(56) References Cited

U.S. PATENT DOCUMENTS

| | | | | |
|---|---|---|---|---|
| 4,719,986 | A * | 1/1988 | Richardson, Jr. | ............. 180/287 |
| 5,361,646 | A * | 11/1994 | Venable | ............ 74/531 |
| 5,921,577 | A * | 7/1999 | Weiss et al. | ................. 280/775 |
| 6,964,211 | B1 * | 11/2005 | St. Myer | ........................ 74/492 |
| 7,010,966 | B2 | 3/2006 | Kitazawa et al. | |
| 7,077,027 | B2 * | 7/2006 | Krizan et al. | ................... 74/493 |
| 7,413,222 | B2 | 8/2008 | Higashino et al. | |
| 7,516,985 | B2 | 4/2009 | Cymbal et al. | |
| 2005/0217407 | A1 | 10/2005 | Yamamura | |
| 2006/0028010 | A1 * | 2/2006 | Yamada | ....................... 280/775 |
| 2006/0207378 | A1 | 9/2006 | Kramer et al. | |
| 2006/0207380 | A1 * | 9/2006 | Higashino | ....................... 74/493 |
| 2006/0290127 | A1 * | 12/2006 | Cymbal et al. | ................ 280/775 |

(Continued)

FOREIGN PATENT DOCUMENTS

| | | |
|---|---|---|
| EP | 2055612 A2 | 5/2009 |
| JP | 10-053144 A | 2/1998 |
| KR | 20080035823 A | 4/2008 |
| WO | WO 20091138578 A1 | 11/2009 |

OTHER PUBLICATIONS

English language abstract and machine-assisted translation for JP 10-053144 extracted from espacenet.com database on Jul. 22, 2013, 26 pages.
English language abstract and figures for KR 20080035823 extracted from espacenet.com database on Jul. 23, 2013, 3 pages.

(Continued)

*Primary Examiner* — David M Fenstermacher
*Assistant Examiner* — Jake Cook
(74) *Attorney, Agent, or Firm* — Howard & Howard Attorneys PLLC

(57) ABSTRACT

A steering column assembly includes an outer jacket defining a through aperture and an inner jacket slidably disposed within the outer jacket. A plurality of steering shafts are movable relative to one another within the inner jacket. A frictional plate is disposed within the through aperture for selectively engaging the inner jacket. A radial force transmitting assembly is coupled to the frictional plate and applies a force on the frictional plate causing the frictional plate to engage the inner jacket. The radial force transmitting assembly includes a first cam member and a second cam each coupled to the frictional plate and each including a plurality of inclined surfaces facing one another. A lever is coupled to one of the cam members for rotating the other of the cam members for applying a force on the frictional plate to prevent movement of the steering shafts.

21 Claims, 3 Drawing Sheets

(56) References Cited

U.S. PATENT DOCUMENTS

2007/0068310 A1* 3/2007 Arihara .......................... 74/493
2009/0056493 A1* 3/2009 Dubay et al. .................... 74/492
2009/0241721 A1* 10/2009 Inoue et al. ..................... 74/493
2011/0259140 A1 10/2011 Fevre

OTHER PUBLICATIONS

English language abstract for WO 2009/138578 extracted from espacenet.com database on Jul. 23, 2013, 1 page. See also English Equivalent US2011/0259140.
European Search Report for Application No. EP 10181058 dated Feb. 17, 2011, 3 pages.

* cited by examiner

STEERING COLUMN ASSEMBLY

RELATED APPLICATION

The subject patent application claims priority to and all the benefits of European Patent Application No. 10181058.8, which was filed on Sep. 28, 2010 with the European Patent Office, the disclosure of which is hereby incorporated by reference.

TECHNICAL FIELD

The present invention relates to steering columns of the telescopic type in which an inner jacket cooperate with an outer jacket to which the inner jacket can be locked.

BACKGROUND OF THE INVENTION

This invention relates to steering columns, more specifically, it relates to the locking mechanism of a telescopic steering column.

Steering columns are normally both telescopic and tiltable, so that a user can adjust the position of a steering wheel by pivoting the steering column and or moving the steering wheel for and aft in the direction of said steering column.

Steering columns are often manufactured in small and customized series. Often, the steering column must be manufactured with a customized length and diameter, to suit the vehicle in which it is to be installed. For this reason, it is advantageous if as many of the components of the steering column as possible can be standardized, i.e. the same for all series.

Modern day vehicles, especially off-high way industrial vehicles, require the driver to control multiple various functions of the vehicle, such as for instance manoeuvring the bucket of a wheel-loader. Therefore, the space in the vicinity of the driver is limited; it is therefore advantageous if the steering column can be compact.

It is further advantageous for the locking mechanism to allow for quick and easy adjustment of the locking mechanism. The locking mechanism may need to be adjusted during assembly of the steering column to compensate for production deviations of the parts. The locking mechanism may also need to be adjusted when the steering column is installed in a vehicle, e.g. for the purpose of compensating for wear of the parts. In this instance, it is important that a mechanic is allowed easy access to the adjustment means.

It is previously known from the prior art a telescope lock for a steering column which lock includes a frictional plate disposed in a window of an outer jacket and in contact with an inner jacket. The frictional plate locks the jackets relative one another in the axial direction when said plate is subjected to a force which urges the frictional plate towards the axes of the jackets. This mechanism includes a pivotal lever which is pivoted by rotation of an actuation lever.

Previously known are also various types of cam mechanisms used in locking mechanism for telescopic steering columns.

To use a cam mechanism, i.e. two cam members with co-operating inclined surfaces, one of which is connected to a pivotal lever such that when the lever is pivoted, the effective width of the cam mechanism is increases, in order to lock a telescopic function of a steering column as such is known. Patents that show cam mechanisms includes for example U.S. Pat. No. 7,010,966, US 2006/0207378, U.S. Pat. No. 7,413,222, US 2005/0217407, U.S. Pat. No. 5,921,577 and U.S. Pat. No. 7,516,985.

These prior art references discloses a telescopic lock which includes a bracket comprising two sidearm's which are disposed on either side of a jacket. A bolt connects the two sidearms and the cam mechanism is disposed on this bolt. When a cam mechanism is activated, i.e. widened, it locks the jacket by decreasing the distance between the two sidearms.

A telescopic steering column with such configuration suffers from the disadvantage that the sidearms, and therefore, the locking mechanism, will protrude from the steering column and into the driver's compartment of the vehicle.

Another prior art reference, JP100 53 144 A, discloses a telescope lock in which two clamps, bracket parts, are disposed around an outer jacket, a frictional plate disposed in a window of the outer jacket and in contact with an inner jacket, a locking mechanism connected to a pivotal lever. The locking mechanism includes a boss disposed on and protruding from said outer jacket, the boss is internally threaded, a threaded rock bolt is disposed in said boss and connected to said pivotal lever. When the pivotal lever is pivoted, the rock bolt is rotated in the boss and consequently, it pushes the frictional plate into connection with the inner jacket according to its FIG. 2.

Another prior art reference, U.S. Pat. No. 7,516,985, discloses a locking mechanism for the telescopic movement between two jackets of a steering column. Incidentally, the same locking mechanism is used to lock the pivotal movement of the jackets as well. The locking mechanism comprises a first bracket which is attached to the outer jacket, the first bracket includes two sidewalls which includes two longitudinal slots which are parallel to the axis of the outer jacket, but disposed at a distance from the circumference from the jacket, such to allow a bolt to go through both of them. The locking mechanism further includes a second bracket which comprises two sidewalls which are disposed outside and parallel to the two side walls of the first bracket, a lock bolt is disposed through windows in the two side walls of the second bracket and said longitudinal slots. On a first side, the bolt is non-rotationally connected to a pivotal lever, the proximal end of the lever constitutes a first earn member which includes a cam surface which is circumferentially distributed around the lock bolt. Rotationally disposed on the lock bolt is a second cam member. On a second side of the bolt, the bolt is threaded and is intended to receive a nut.

In operation, the locking mechanism operates such that when the operational lever is turned, the cam members will effectively increase or decrease their effective width and thus compress or release the second bracket's side walls, respectively, thus clamping or unclamping the first bracket.

OBJECT OF THE INVENTION

One object of the present invention is to provide a locking mechanism for a telescopic steering column which mechanism requires a minimum of space and which is also easy to handle and easy to adjust in view of the clamping force of the locking mechanism.

Another object of the present invention is to provide such a locking mechanism for a steering column having a minimum of cooperating parts.

The object is also to provide a compact locking mechanism for a telescopic steering column.

A further objective of the present invention is to provide a locking mechanism for a telescopic steering column which is easy to adjust for wear and manufacturing deviations.

Still a further objective of the present invention is to provide a locking mechanism for a telescopic steering column where as many of the components as possible are independent of the length and diameter of the steering column.

DISCLOSURE OF THE INVENTION

These objects are achieved by means of the present invention as defined in the accompanying independent patent claim. Suitable further embodiments of the invention will be apparent from the accompanying dependent patent claims.

The present invention provides a locking mechanism for a telescopic steering column. The telescopic steering column comprises; an inner steering shaft which is axially slidable but non-rotationally disposed in an outer steering shaft. The steering shafts are disposed in a column jacket; the column jacket comprises an inner jacket and an outer jacket. The inner jacket is axially slidably disposed in the outer jacket. The outer shaft is mounted to the outer jacket such that it is able to rotate relative the outer jacket, but non-displaceable in the axial direction, the inner shaft is mounted in a corresponding manner in the inner jacket. By means of these jackets and shafts, a telescopic steering column is achieved.

The outer shaft is non-rotatably connected to a steering wheel. Upon rotation of the steering wheel the shafts will transfer commands to a receiving organ which may be a wheel structure of a vehicle.

It is desirable to provide a steering wheel which is adjustable back and forth as well as tiltable. The back and forth adjusting is provided by the telescopic function described above, whilst the tilt is provided by a pivotal connection of the above described parts relative the interior of the vehicle. An additional advantage of the locking mechanism of present invention is that it is independent of any such pivotal connection, and as such, does not need to take into account said tilting motion.

A locking mechanism is mounted on the outer jacket, the locking mechanism comprises a two parted bracket which is clamped together around the outer jacket and secured in clamping position by means of standard bolts which goes through both parts of the bracket. These two brackets together defines a housing. During telescopic movement, this bracket will follow the outer jacket. The bracket is prevented from rotational displacement relative the outer jacket by a rotational stop on a first part of the bracket which protrudes into an aperture of the outer jacket. Said rotational stop further protrudes through the outer jacket, a guide bushing and the inner jacket, such as to prevent rotation of the parts, relative one another.

The second part of the bracket includes a housing part in which a cam mechanism is disposed.

The cam mechanism comprises, from the outer jacket and outwards, a frictional plate, a second cam member, a first cam member and an adjustment screw. Each cam member includes a number of inclined surfaces, said surfaces facing each other. The first cam member is fixed rotational relative said housing and includes a bore through its middle portion, the second cam member is connected to a lever and includes an internally threaded bushing on which the first cam member is disposed, the adjustment screw protrudes from an opening in the housing and penetrates the bore of the first cam member and is threaded through the second cam member such that it protrudes from the other side of the second cam member towards an abutting surface on the frictional plate. The frictional plate is disposed in a window in the outer jacket and lies in contact with the inner jacket.

To lock the lock mechanism, the lever is pivoted such to rotate the second cam member, upon rotation the first cam member pushes the second member away from the first cam member and towards the jacket, by means of the cam members structures. As the screw is threadedly attached to the second cam member, it follows the second cam member during this movement. As the pivotal movement of the lever is completed, the screw will abut the abutting surface and thus the frictional plate will prevent any axial movement between the jackets. The adjustment screw comprises a threaded rod, which at the outer end protruding from the housing has means for receiving a tool to rotate the threaded rod, and a stop nut. The stop nut will, when the locking mechanism is assembled, abut the outwardly protruding boss of the second cam member. To adjust the adjustment screw, either at assembly of the steering column or during service, an assembler/mechanic needs only to rotate the threaded rod which will adjust the position of the abutting end relative the second cam member and consequently the frictional plate. By means of this adjustment screw, adjustments due to tolerances in or wear of the parts is simplified.

To enhance the axial sliding between the jackets, a guide bushing is disposed between the two jackets. The guide bushing is preferably made of a polymer material. The guide bushing is generally tubularly shaped and includes a lower lip which will abut against the lower rim of the outer jacket, an aperture for receiving the rotational stop of the bracket and a window for receiving the frictional plate. By means of the aperture and the window, the bushing will follow the outer jacket as it is displaced relative the inner jacket.

The invention relates to a steering column assembly provided with steering shafts which are axially movable but rotation prevented in relation to each other. They are mounted in a column jacket which comprises an outer jacket and an inner jacket. The inner jacket is being axially slidably disposed in the outer jacket which is provided with a first through aperture extending through the outer jacket. In the aperture there is provided a frictional plate located and provided with radially force transmitting means arranged for applying a radial directed force on the frictional plate resulting in that the frictional plate is being pressed against the inner jacket while manoeuvring the force transmitting means. The force transmitting means comprises a first cam member and a second cam member each of which includes a number of inclined surfaces facing each other. One of the cam members is rotationally fixed in relation to the frictional plate while the other cam member is rotationally mounted in relation to said plate by a lever in order to provide an axial displacement force between the two cam members by said surfaces. The displacement force provides radial directed motion acting upon the frictional plate.

In an embodiment of the invention the movement exerted on the other cam member is provided as a rotation.

In an embodiment of the invention the first cam member is fixed mounted while the second cam member is rotatable mounted in relation to the frictional plate.

In an embodiment of the invention the first cam member is provided with a channel through its middle portion through which channel an adjustment screw protrudes and also that the adjustment screw is provided with a thread which is in engagement with a corresponding thread in the second cam member and also that the end of the adjustment screw abut the outer surface of the frictional plate.

In an embodiment of the invention the adjustment screw is threadedly attached to the second cam member by a boss extending through the first cam member.

In an embodiment of the invention the force transmitting means and the frictional plate are mounted in and covered by a housing or a part of a housing.

In an embodiment of the invention the adjustment screw protrudes from an opening in the housing and penetrates the channel of the first cam member and is threaded through the second cam member such that it protrudes from the other side of the second cam member directed towards the frictional plate and with an abutting contact with the frictional plate.

In an embodiment of the invention the housing is provided with a rotational stop extending radially from the inner surface of the housing through the outer jacket into a longitudinal guiding slot in the inner jacket.

In an embodiment of the invention a guide bushing is provided between the outer jacket and the inner jacket.

In an embodiment of the invention the guide bushing is provided with a guiding tap protruding into the longitudinal guiding slot in the inner jacket.

BRIEF DESCRIPTION OF THE DRAWINGS

The invention will now be described in more detail with reference to an exemplifying embodiment thereof illustrated in the accompanying drawings, in which.

DESCRIPTION OF THE INVENTION

Figure 1:
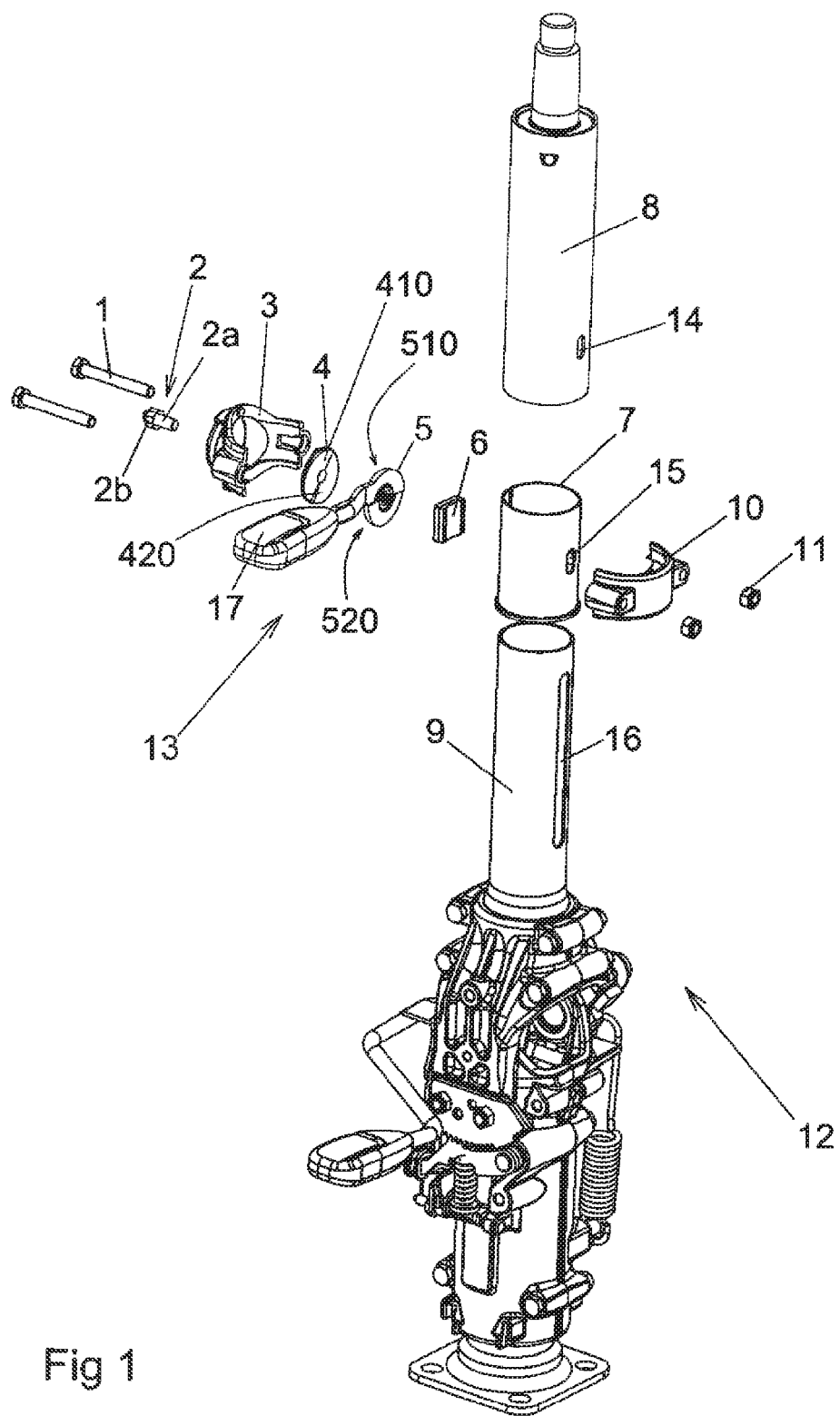
FIG. 1 illustrates a steering column assembly with an exploded view of a telescopic locking mechanism.

FIG. 1 illustrates a steering column assembly 12 provided with a telescopic locking mechanism 13. The locking mechanism comprises screws 1 which protrudes through a second mounting bracket 3 and through a first mounting bracket 10 which brackets are fixed by locking nuts 11. These two mounting brackets forms a housing of the locking mechanism clamped, while mounted, on an outer jacket 8 of the steering column assembly 12. The outer jacket 8 is slidingly mounted onto a telescope guide bushing 7 and locked to the bushing by a radial protrusion serving as a rotational stop inside the first mounting bracket 10 which protrusion extends through a first window 14 in the outer jacket 8 and through a second window 15 in the bushing 7 and into a longitudinal guiding slot 16 in an inner jacket 9.

Inside the second mounting bracket 3 a first cam member 4 is rotationally fixed to the second mounting bracket 3. The first cam member 4 is provided with inclined surfaces 410, 420 acting as cam surfaces directed towards corresponding inclined surfaces 510, 520 on a second cam member 5. The second cam member 5 cooperates with a frictional plate 6 located in a first through aperture in the outer jacket 8 and in a second aperture in the bushing 7 so that said plate 6 has frictional contact with the outer surface of the inner jacket 9. The second cam member 5 is provided with a telescope lever 17 by which the second cam member 5 can be rotated in relation to the first cam member 4. Such a rotation operated by the lever 17 exerts a force directed towards the frictional plate 6 either directly or via an adjustment screw which is thus pressed towards the inner jacket 9. Thereby a locking of the outer jacket in relation to the inner jacket will be made.

Furthermore, an adjustment screw 2, having an external threaded rod 2a which cooperates with a boss, is mounted centrally from the outside of the housing in towards and abuts the frictional plate 6. The boss having an internal thread cooperating with the adjustment with the rod 2a of the screw 2 is mounted in a centre hole in the second cam member 5 and is provided with a rim in order to axially lock the boss to the second cam member in order to prevent axial movement of the boss when operating the adjustment screw. The adjustment screw comprises means for receiving a tool to rotate its threaded rod and the screw is in its outer end provided with a stop nut 2b. The stop nut will, when the locking mechanism, abut the outer end of the boss of the second cam member 5.

Figure 2:
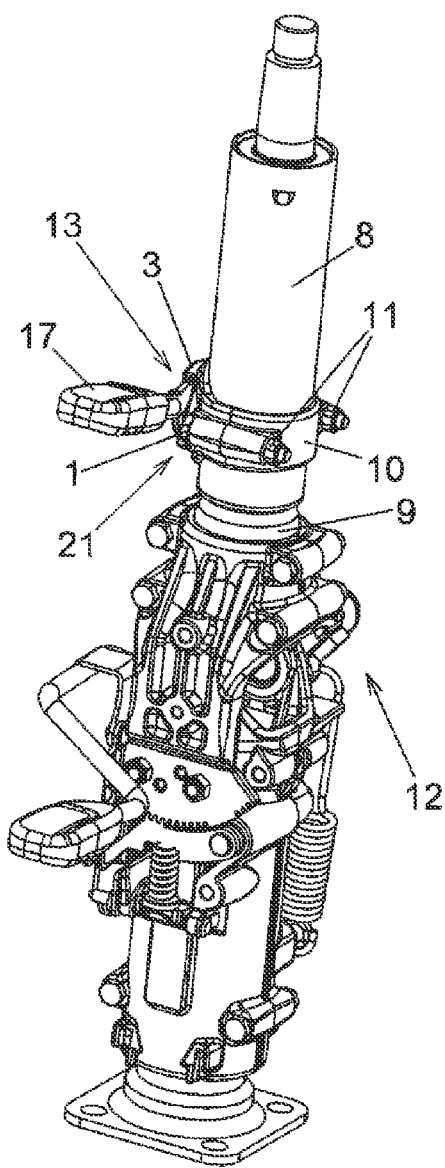
FIG. 2 illustrates the steering column with the mounted telescopic locking mechanism.

FIG. 2 illustrates the steering column assembly 12 in a mounted view where the locking mechanism 13 is clamped around the outer jacket 8 which is disclosed in the compressed lowest position of the outer jacket 8 in relation to the inner jacket 9 and covers the guide bushing. The figure shows the housing 21 with its first mounting bracket 10 and its second mounting bracket 3 connected by the screws 1 and the locking nuts 11. Also the operating lever 17 is thereby mounted in the housing 21 for rotation of the second cam member. FIG. 2 clearly illustrates that the locking mechanism 13 requires a minimum of space and that the telescopic locking mechanism also is easy to handle and easy to adjust in view of the clamping force of the locking mechanism provided for the frictional plate. The housing 21 can in second embodiments, be mounted from either side in that the screws 1 directly cooperates with internal threads in either the first mounting bracket 3 or the second mounting bracket 10 instead of using the said nuts 11.

Figure 3:
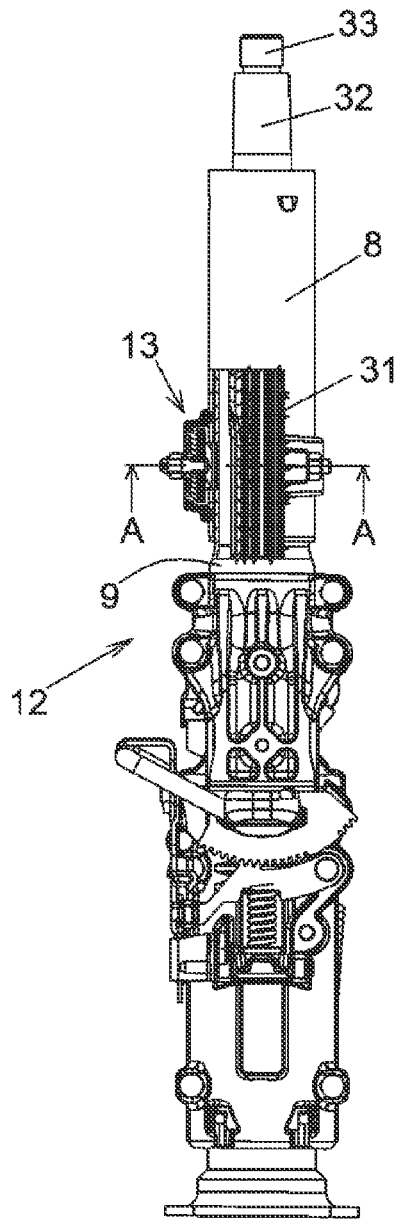
FIG. 3 illustrates a front view of the steering column with the telescopic locking mechanism of the steering column partly in section.

FIG. 3 illustrates a front view of the steering column assembly 12 with the telescopic locking mechanism 13 of the steering column partly in section. Internally in the outer jacket 8 and in the inner jacket 9 there is a telescopically inner steering shaft 31 which is axially slidable but non-rotationally disposed in an outer steering shaft 32 to which a mounting structure 33 for a steering wheel, not disclosed in the figures, is directly attached. The connection between the inner steering shaft and the outer steering shaft is arranged as a splines arrangement for longitudinally motion between these parts but rotationally prevented in relation to each other. A steering wheel is conventionally directly mounted to this mounting structure 33 of the outer steering shaft 32.

Figure 4:
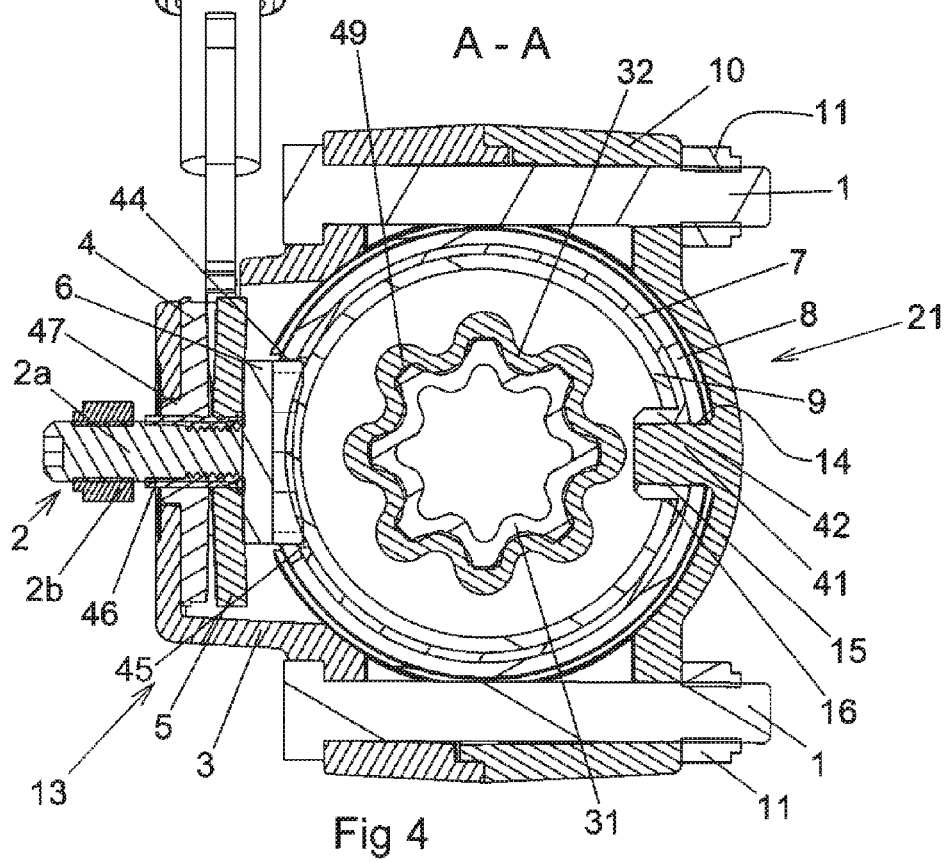
FIG. 4 illustrates an enlarged cross sectional view A-A of the telescopic locking mechanism in FIG. 3.

FIG. 4 illustrates a cross section A-A from FIG. 3 through the locking mechanism 13. The first mounting bracket 10 of the housing 21 is connected to the second mounting bracket 3 of the housing 21 by the screws 1 and the nuts 11. The inner surface of the first mounting bracket 10 is provided with a radially directed protrusion acting as a rotational stop 41 extending through the first window 14 in the outer jacket 8 and through the second window 15 in the bushing 7 and into a longitudinal guiding slot 16 in the inner jacket 9 via a guiding tap 42 in the bushing 7. Also disclosed inside the inner jacket 9 is the outer steering shaft 32 axially movably on the inner steering shaft 31 via the splines arrangement 49.

Opposite the rotational stop 41 in the housing the frictional plate 6 is mounted in the first through aperture 44 in the outer jacket 8 and in the second aperture 45 in the bushing 7 with a frictional contact with the outer surface of the inner jacket 9. Abutting the outer surface or protruding in a recess in the surface of the frictional plate 6 is the threaded rod 2a of the adjustment screw 2 which is threaded into a cylindrical boss 46 attached centrally to the second cam member 5 which boss extending through a channel centrally located through both the first cam member 4 and the second mounting bracket 3 of the housing 21. The boss 46 is axially fixed in relation to the second cam member 5 in order to prevent the boss to slide out from the cam members 4, 5 when the adjustment screw 2 is being tightened. Preferably the both cam members 4, 5 have a circular shape but also other shapes of the cam members are possible within the scope of the invention. The first cam member 4 is provided with a collar 47 for radial guidance in the second mounting bracket 3. Threaded onto the treaded rod 2a of the adjustment screw 2 is the stop nut 2b which abuts the outer end of the boss 46 when the adjustment screw 2b is being locked.

Figure 5:
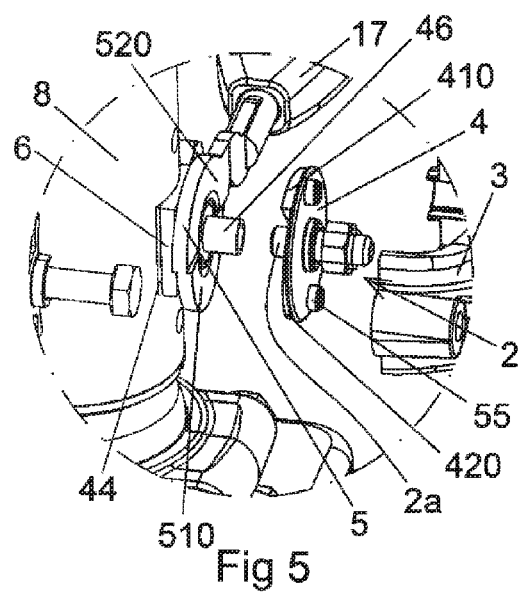
FIG. 5 illustrates an enlarged mounting view of parts of the telescopic locking mechanism.

FIG. 5 illustrates a mounting view with the frictional plate 6 in the first through aperture 44 in the outer jacket 8. The second cam member 5 contacts the frictional plate 6 via its boss 46 and the treaded rod 2a of the adjustment screw 2. FIG. 5 also discloses the two inclined surfaces 510, 520 on the second cam member 5 and the two inclined surfaces 410, 420 on the first cam member 4 which respective inclined surfaces cooperates with each other so that a separating radial force will apply when the second cam member 5 rotates in relation to first cam member 4. In order to prevent rotation of the first cam member 4, when the second cam member 5 is rotated by the lever 17, the first cam member 4 is provided with tabs 55 or the like which cooperates with corresponding recesses in the second mounting bracket 3 of the housing.

A single embodiment has been described in this application but details of various parts in the described locking mechanism can be varied within the scope of the invention as defined in the claims.

The invention claimed is:

1. A steering column assembly (12) with steering shafts (31, 32) axially movable along a longitudinal axis but prevented from rotating about the longitudinal axis in relation to each other and disposed in a column jacket (8, 9), the column jacket comprising an outer jacket (8) and an inner jacket (9), the inner jacket (9) being axially slidable along the longitudinal axis and disposed in the outer jacket (8), the outer jacket (8) is provided with a first through aperture (44) extending through the outer jacket (8) defining a second axis transverse to the longitudinal axis, and a frictional plate (6) located at least partially in the first through aperture (44) and a radially force transmitting assembly (2, 4, 5, 46) arranged for applying a radial directed force relative to the longitudinal axis on the frictional plate (6) resulting in the frictional plate (6) being pressed against the inner jacket (9) while maneuvering the force transmitting assembly (2, 4, 5, 46), with the force transmitting assembly (2, 4, 5, 46) comprising a first cam member (4) and a second cam member (5), each of which includes a number of inclined surfaces (510, 520, 410, 420) facing each other and with one of the cam members (4) fixedly mounted in relation to the frictional plate (6) while an other of the cam members (5) is rotationally mounted in relation to the frictional plate (6) and operated by a lever (17) in order to provide a radial displacement force relative to the longitudinal axis between the two cam members (4, 5) by the surfaces which displacement force provides a radial motion acting upon the frictional plate (6) and directed towards the inner jacket (9), and with the frictional plate (6) and the first and second cam members (4, 5) being aligned along the second axis.

2. The steering column assembly according to claim 1, wherein a movement exerted on the other of the cam members (5) is defined as a rotational movement.

3. The steering column assembly according to claim 2, wherein the first cam member (4) further includes a middle portion defining a channel and is fixedly mounted and the second cam member (5) is rotationally mounted in relation to the frictional plate (6).

4. The steering column assembly according to claim 3, further including a boss (46) and an adjustment screw (2) extending through the channel for engaging the boss (46) with the boss (46) being axially fixed in relation to the second cam member (5) and the adjustment screw abutting the frictional plate (6).

5. The steering column assembly according to claim 4, wherein the adjustment screw (2) is attached to the second cam member (5) by the boss (46) and extends through the first cam member (4).

6. The steering column assembly according to claim 1, further including a housing (6) wherein the force transmitting assembly (2, 4, 5, 46) and the frictional plate (6) are mounted in and covered by the housing (21).

7. The steering column assembly according to claim 6, further including an adjustment screw (2), wherein the housing (21) defines an opening with the adjustment screw (2) protruding from the opening for penetrating the first cam member (4) and the second cam member (5) such that the adjustment screw (2) is in abutting contact with the frictional plate (6).

8. The steering column assembly according to claim 7, wherein the inner jacket (9) defines a longitudinal guiding slot (16) and the housing (21) further includes a mounting bracket (10) having an inner surface and a rotational stop (41) extending from the inner surface of the mounting bracket (10) and through the outer jacket (8) into the longitudinal guiding slot (16) defined by the inner jacket (9).

9. The steering column assembly according to claim 1, further including a guide bushing (7) disposed between the outer jacket (8) and the inner jacket (9).

10. The steering column assembly according to claim 9, wherein the inner jacket (9) defines a longitudinal guiding slot (16) and the guide bushing (7) further includes a guiding tap (42) protruding into the longitudinal guiding slot (16) defined by the inner jacket (9).

11. A steering column assembly comprising:
an outer jacket defining a first through aperture that defines a second axis;
an inner jacket defining a longitudinal axis that is transverse to the second axis and being slidably disposed along the longitudinal axis within the outer jacket;
a plurality of steering shafts movable relative to one another along the longitudinal axis and disposed within the inner jacket;
a frictional plate disposed within the first through aperture of the outer jacket and selectively engaging the inner jacket;
a radial force transmitting assembly coupled to the frictional plate for applying a force on the frictional plate radially relative to the longitudinal axis which causes the frictional plate to engage the inner jacket, the radial force transmitting assembly comprising:
a first cam member and a second cam member each coupled to the frictional plate such that at least one of the first and second cam members is rotatable relative to the frictional plate with the first cam member having a first plurality of inclined surfaces and the second cam member having a second plurality of inclined surfaces facing the first plurality of inclined surfaces, and with the first and second cam members and the frictional plate being aligned along the second axis; and
a lever coupled to one of the first and second cam members for rotating the other of the second and first cam members for applying a radial force relative to the longitudinal axis on the frictional plate through the cam members such that the frictional plate engages the inner jacket for preventing axial movement of the steering shafts along the longitudinal axis.

12. The steering column assembly according to claim 11, wherein the steering shafts are prevented from rotating about the longitudinal axis relative to one another.

13. The steering column assembly according to claim 11, wherein one of the first and second cam members includes a middle portion defining a channel and is fixedly mounted and the other of the second and first cam members is rotationally mounted in relation to the frictional plate.

14. The steering column assembly according to claim 13, further including a boss and an adjustment screw extending through the channel for engaging the boss with the boss being axially fixed in relation to one of the first and second cam members and the adjustment screw abutting the frictional plate.

15. The steering column assembly according to claim 14, wherein the adjustment screw is attached to one of the first and second cam members by the boss and extends through the other of the second and first cam members.

16. The steering column assembly according to claim 11, further including a housing wherein the force transmitting assembly and the frictional plate are mounted in and covered by the housing.

17. The steering column assembly according to claim 16, further including an adjustment screw, and wherein and lithe housing defining an opening with the adjustment screw protruding from the opening for penetrating the first cam member and the second cam member such that the adjustment screw is in abutting contact with the frictional plate.

18. The steering column assembly according to claim 17, wherein the inner jacket defines a longitudinal guiding slot and the housing further includes a mounting bracket having an inner surface and a rotational stop extending from the inner surface of and through the outer jacket into the longitudinal guiding slot defined by the inner jacket.

19. The steering column assembly according to claim 11, further including a guide bushing disposed between the outer jacket and the inner jacket.

20. The steering column assembly according to claim 19, wherein the inner jacket defines a longitudinal guiding slot and the guide bushing further includes a guiding tap protruding into the longitudinal guiding slot defined by the inner jacket.

21. The steering column assembly according to claim 1 wherein each of the first and second cam members comprises first and second sides and at least one of the first and second cam members comprises an inclined surface on each of the first and second sides.

* * * * *

UNITED STATES PATENT AND TRADEMARK OFFICE
CERTIFICATE OF CORRECTION

| | |
|---|---|
| PATENT NO. | : 8,661,931 B2 |
| APPLICATION NO. | : 13/247355 |
| DATED | : March 4, 2014 |
| INVENTOR(S) | : Olsson |

It is certified that error appears in the above-identified patent and that said Letters Patent is hereby corrected as shown below:

IN THE CLAIMS:

Column 9, line 24, please delete "wherein and lithe" and replace with --wherein and the--

Signed and Sealed this
Third Day of June, 2014

Michelle K. Lee
*Deputy Director of the United States Patent and Trademark Office*